United States Patent
Ashworth

(10) Patent No.: US 7,226,497 B2
(45) Date of Patent: Jun. 5, 2007

(54) FANLESS BUILDING VENTILATOR

(75) Inventor: Nicholas Ashworth, Dublin, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 11/288,846

(22) Filed: Nov. 29, 2005

(65) Prior Publication Data
US 2006/0114637 A1    Jun. 1, 2006

Related U.S. Application Data

(60) Provisional application No. 60/632,320, filed on Nov. 30, 2004.

(51) Int. Cl.
*B03C 3/155*    (2006.01)
(52) U.S. Cl. .................. 95/70; 95/73; 95/78; 96/18; 96/62; 96/74; 454/237
(58) Field of Classification Search ............ 96/18, 96/19, 24, 25, 30, 31, 55, 74, 96, 97, 60, 96/62; 95/2–4, 7, 70, 73, 74, 78; 361/230–235; 454/237

See application file for complete search history.

(56) References Cited

U.S. PATENT DOCUMENTS

| | | | |
|---|---|---|---|
| 2,765,975 A | | 10/1956 | Lindenblad |
| 2,795,401 A | * | 6/1957 | Cooper et al. ............ 165/5 |
| 3,503,348 A | | 3/1970 | Dvirka |
| 3,504,482 A | * | 4/1970 | Goettl ..................... 96/18 |
| 3,638,058 A | | 1/1972 | Fritzius |
| 3,699,387 A | | 10/1972 | Edwards |
| 3,751,715 A | | 8/1973 | Edwards |
| 3,930,611 A | | 1/1976 | Demaray |
| 3,973,927 A | * | 8/1976 | Furchner et al. ............ 95/3 |
| 4,076,011 A | | 2/1978 | Proulx |
| 4,210,847 A | | 7/1980 | Shannon et al. |
| 4,231,766 A | | 11/1980 | Spurgin et al. |

(Continued)

FOREIGN PATENT DOCUMENTS

CA    2117222    9/1995

(Continued)

OTHER PUBLICATIONS

The Sharper Image, SI857 OzoneGuard Professional Series Ionic Breeze Quadra Silent Air Purifier, pages printed from website, date last visited Nov. 14, 2005, 5 pages, http://www.sharperimagebest, com/si857.html.

(Continued)

*Primary Examiner*—Richard L. Chiesa
(74) *Attorney, Agent, or Firm*—Reinhart Boerner Van Deuren P.C.

(57) ABSTRACT

A ventilation system for a building is provided. The ventilation system includes a pair of passages between the interior and exterior of the building and at least one corona discharge apparatus for drawing fluid through the passages. The ventilation system may also include an energy recovery ventilator for transferring energy, humidity or the combination of energy and humidity between the fluid flowing through the two passages. Variable flow rates through the passages are provided by varying the voltage to the corona discharge apparatus. In addition, the corona discharge apparatuses may filter the air flowing through the passages.

23 Claims, 2 Drawing Sheets

U.S. PATENT DOCUMENTS

| | | |
|---|---|---|
| 4,282,591 A | 8/1981 | Andreuccetti |
| 4,288,990 A | 9/1981 | Schulz |
| 4,343,776 A | 8/1982 | Carr et al. |
| 4,380,720 A | 4/1983 | Fleck |
| 4,405,507 A | 9/1983 | Carr et al. |
| 4,462,540 A | 7/1984 | Dytch |
| 4,643,745 A | 2/1987 | Sakakibara et al. |
| 4,675,029 A | 6/1987 | Norman et al. |
| 4,694,817 A | 9/1987 | Nilsson |
| 4,789,801 A | 12/1988 | Lee |
| 4,812,711 A * | 3/1989 | Torok et al. ............ 315/111.91 |
| 4,955,991 A * | 9/1990 | Torok et al. .................... 96/50 |
| 4,969,508 A | 11/1990 | Tate et al. |
| 5,042,997 A * | 8/1991 | Rhodes .......................... 96/18 |
| 5,055,115 A * | 10/1991 | Yikai et al. ..................... 96/59 |
| 5,071,455 A | 12/1991 | Abedi-Asi |
| 5,077,500 A | 12/1991 | Török et al. |
| 5,082,173 A | 1/1992 | Poehlman et al. |
| 5,144,941 A | 9/1992 | Saito et al. |
| 5,271,558 A | 12/1993 | Hampton |
| 5,272,477 A | 12/1993 | Tashima et al. |
| 5,422,331 A | 6/1995 | Galligan et al. |
| 5,579,647 A | 12/1996 | Calton et al. |
| 5,595,342 A | 1/1997 | McNair et al. |
| 5,667,564 A | 9/1997 | Weinberg |
| 5,702,244 A | 12/1997 | Goodson et al. |
| 5,803,357 A | 9/1998 | Lakin |
| 5,833,134 A | 11/1998 | Ho et al. |
| 5,924,486 A | 7/1999 | Ehlers et al. |
| 5,931,016 A | 8/1999 | Yoho, Sr. |
| 5,958,112 A | 9/1999 | Nojima |
| 6,116,512 A | 9/2000 | Dushane et al. |
| 6,129,781 A * | 10/2000 | Okamoto et al. ............... 96/25 |
| 6,176,977 B1 | 1/2001 | Taylor et al. |
| 6,213,404 B1 | 4/2001 | Dushane et al. |
| 6,287,368 B1 * | 9/2001 | Ilmasti ........................... 96/19 |
| 6,355,091 B1 | 3/2002 | Felber et al. |
| 6,375,902 B1 | 4/2002 | Moini et al. |
| 6,375,905 B1 | 4/2002 | Moini et al. |
| 6,449,533 B1 | 9/2002 | Mueller et al. |
| 6,464,754 B1 | 10/2002 | Ford |
| 6,481,222 B1 | 11/2002 | Denniston |
| 6,504,308 B1 | 1/2003 | Krichtafovitch et al. |
| 6,508,982 B1 * | 1/2003 | Shoji ........................... 422/22 |
| 6,513,723 B1 | 2/2003 | Mueller et al. |
| 6,557,365 B2 | 5/2003 | Dinnage et al. |
| 6,575,228 B1 | 6/2003 | Ragland et al. |
| 6,635,106 B2 * | 10/2003 | Katou et al. .................... 96/67 |
| 6,664,741 B1 | 12/2003 | Krichtafovitch |
| 6,699,529 B2 | 3/2004 | Garner et al. |
| 6,711,907 B2 | 3/2004 | Dinnage et al. |
| 6,727,657 B2 | 4/2004 | Krichtafovitch et al. |
| 6,751,964 B2 | 6/2004 | Fischer |
| D499,476 S | 12/2004 | Holderfield et al. |
| D500,848 S | 1/2005 | Holderfield et al. |
| D501,042 S | 1/2005 | Holderfield et al. |
| 6,854,279 B1 | 2/2005 | Digiovanni et al. |
| 2001/0032544 A1 * | 10/2001 | Taylor et al. .................. 96/19 |
| 2001/0048030 A1 | 12/2001 | Sharood et al. |
| 2003/0024487 A1 | 2/2003 | Hughes |
| 2003/0090209 A1 | 5/2003 | Krichtafovitch et al. |
| 2003/0234618 A1 | 12/2003 | Krichtafovitch |
| 2004/0004440 A1 | 1/2004 | Krichtafovitch et al. |
| 2004/0004797 A1 | 1/2004 | Krichtafovitch et al. |
| 2004/0133314 A1 | 7/2004 | Ehlers et al. |
| 2004/0155612 A1 | 8/2004 | Krichtafovitch |
| 2004/0183454 A1 | 9/2004 | Krichtafovitch |
| 2004/0212329 A1 | 10/2004 | Krichtafovitch et al. |
| 2004/0217720 A1 | 11/2004 | Krichtafovitch et al. |
| 2005/0011512 A1 | 1/2005 | Bachinski et al. |
| 2005/0043092 A1 | 2/2005 | Eckel et al. |
| 2005/0194457 A1 | 9/2005 | Dolan |
| 2005/0214186 A1 | 9/2005 | Michalakos et al. |
| 2006/0112708 A1 | 6/2006 | Reaves |
| 2006/0112828 A1 | 6/2006 | Ehlers |
| 2006/0112829 A1 | 6/2006 | Ashworth |
| 2006/0112955 A1 | 6/2006 | Reaves |
| 2006/0113398 A1 | 6/2006 | Ashworth |
| 2006/0125648 A1 | 6/2006 | Young |

FOREIGN PATENT DOCUMENTS

| | | | |
|---|---|---|---|
| CA | 2370966AA | 12/2000 | |
| JP | 61134524 A | 6/1986 | |
| JP | 362057662 A | 3/1987 | |
| JP | 63201437 A | 8/1988 | |
| JP | 01312340 A | 12/1989 | |
| JP | 02215037 A | 8/1990 | |
| JP | 4-55121 * | 2/1992 | .................... 95/73 |
| JP | 410043628 A | 2/1998 | |

OTHER PUBLICATIONS

YET2.COM, NoZone The Intelligent Air Freshener, pages printed from website, date last visited Nov. 14, 2005, 2 pages, http://www.yet2.com/app/list/techpak?id=36127&sid=360&abc-0.

Engelhard, PremAir catalyst now part of The Sharper Image's Ionic Breeze Air Purifiers, page printed from website, date last visited Nov. 14, 2005, http://www.engelhard.com/Lang1/xDocID1EF8CDE1FB754A8788E84A989F41EA6C/xDocTable_Cas.

Lara A. Gundel, Douglas P. Sullivan, Gregory Y. Katsapov, William J. Fisk, A pilot study of energy efficient air cleaning for ozone, report, Indoor Environment Department Environmental Energy Technologies Division Lawrence Berkeley National Laboratory, University of California, Nov. 28, 2002, 15 pages, posted at the eScholarship Repository, University of California, http://repositories.cdlib.org/lbnl/LBNL-51836.

Theta Engineering, "Smart" Thermostat, website, date last visited Oct. 26, 2006, previously visited Oct. 27, 2005, 3 pages, http://www.thetaeng.com/SmartThermostat.htm.

* cited by examiner

FANLESS BUILDING VENTILATOR

CROSS-REFERENCE TO RELATED PATENT APPLICATIONS

This patent application claims the benefit of U.S. Provisional Patent Application No. 60/632,320, filed Nov. 30, 2004, the teachings and disclosure of which are hereby incorporated in their entireties by reference thereto.

FIELD OF THE INVENTION

This invention pertains to building ventilator systems, and more particularly to heat recovery ventilators (HRVs) and energy recovery ventilators (ERVs) used to improve indoor air quality.

BACKGROUND OF THE INVENTION

In newly constructed buildings, modern energy-saving building materials are extensively utilized. While this is beneficial from a natural resource perspective, it has a potentially negative impact on the air quality within the building. The well-insulated and sealed building that keeps outside ambient air outside, and conditioned air inside, also prevents pollutants from escaping. Consequently this can lead to sick building syndrome, and problems for allergy suffering occupants.

In order to compensate for this, some building codes are now starting to require energy-efficient ventilation devices such as heat recovery ventilators (HRVs—primarily used in the north) and energy recovery ventilators (ERVs—primarily used in the south). By utilizing these devices, fresh air can be introduced in the building and indoor air quality can be greatly improved. However, such HRVs and ERVs require the use of blower fans to move the air through the system.

Unfortunately, these blower fans generate noise, utilize rotating parts, require a larger housing, have a high operating cost, and cannot act to filter the air that they move.

Therefore, a device that quietly moves, and may filter the air passing through the HRVs and ERVs without moving parts would be desirable. The invention provides such a device. These and other advantages of the invention, as well as additional inventive features, will be apparent from the description of the invention provided herein.

BRIEF SUMMARY OF THE INVENTION

The invention provides a new and improved heat recovery ventilator (HRV) and a new and improved energy recovery ventilator (ERV). More particularly, the invention provides a new and improved HRV and a new and improved ERV that replaces the traditional fan technologies with corona-based air movement technology to exchange indoor/outdoor air. The benefits provided by this technology are: quieter operation, a more compact device, lower operating cost, and trapping contaminants from the incoming air (such as mold and pollen).

In one aspect of the present invention, a ventilation system using solid state corona discharge technology to move air through the system is provided. The system comprises a first passage, a second passage and at least one corona discharge apparatus. The first and second passages include inlets and an outlets such that the first and second passages are in fluid communication between the interior and the exterior of the building. The at least one corona discharge apparatus is positioned relative to at least one of the first passage and the second passage to cause fluid to flow through the first and second passages.

In another aspect, the present invention provides an energy recovery ventilator that uses solid state corona discharge technology to move fluid through the energy recovery ventilator. The energy recovery ventilator comprises a heat exchanger, a first corona discharge apparatus, a second corona discharge apparatus. The first corona discharge apparatus is positioned to move fluid from a first source through the heat exchanger. The second corona discharge apparatus is positioned to move fluid from a second source through the heat exchanger. The heat exchanger is adapted to transfer heat energy between fluid from the first source and fluid from the second source.

In yet another aspect, the invention provides a method of ventilating a building without using a mechanical fan. The method includes the steps of drawing fresh air into the building using a corona discharge apparatus and expelling stale air from the building using a corona discharge apparatus.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
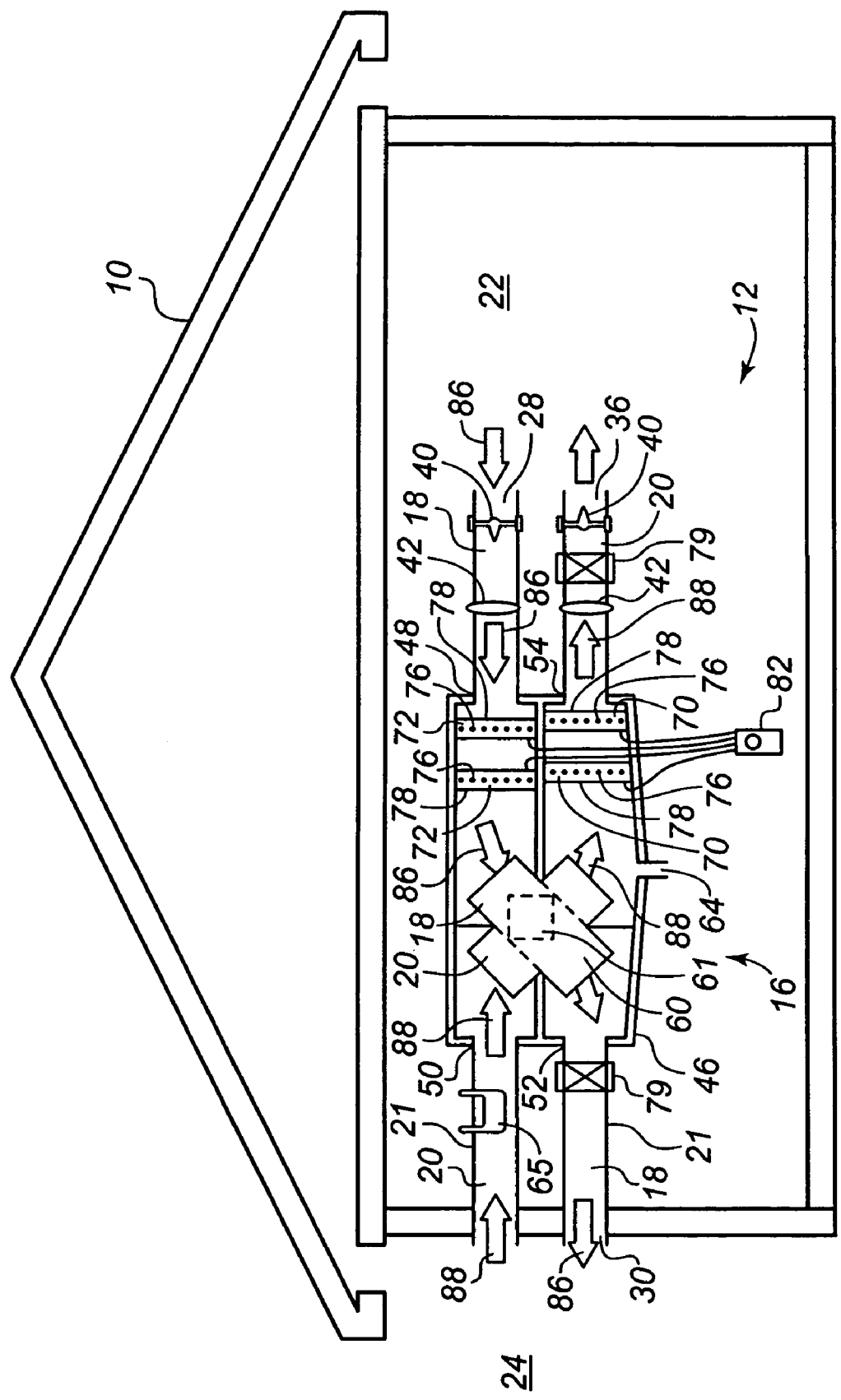
FIG. 1 is a functional diagram of a ventilation system having an HRV/ERV unit constructed in accordance with the teachings of the present invention.

Referring to FIG. 1, a building 10 having a ventilation system 12 constructed in accordance with the present invention is illustrated. As will be described more fully below, the ventilation system 12 is constructed to quietly and efficiently move a fluid (e.g. air) into and out of the building 10 without using moving parts.

As shown, the preferred ventilation system 12 generally comprises a heat recovery ventilator and/or an energy recovery ventilator (hereinafter referred to generally as an HRV/ERV unit 16), a stale air passage 18 and a fresh air passage 20. It will be appreciated that all ventilation systems do not require an HRV/ERV unit.

The stale air passage 18 and the fresh air passage 20 are relatively similar in that they both provide a passage defined by a network of interconnected sealed ducts 21 that connect the interior 22 of the building 10 with the exterior 24 of the building 10 such that the interior 22 and exterior are in controlled fluid communication. The ducts are usually made of a metal material, typically sheet metal. The passages 18, 20 permit fluid (e.g. air) to be transferred either from the interior 22 to the exterior 24 or from the exterior 24 to the interior 22.

The stale air passage 18 allows stale air to be drawn from the interior 22 of the building 10 through the network of ducts and to be expelled to the exterior 24 of the building 10. The stale air passage 18 includes an inlet 28 positioned within the building 10 and an outlet 30 in fluid contact with the exterior 24 of the building 10.

The fresh air passage 20 allows fresh air to be drawn from the exterior 24 of the building 10 and to be supplied to the interior 22 of the building 10. The fresh air passage 20 includes an inlet 34 located in fluid communication with the exterior 24 of the building 10 and an outlet 36 positioned within the building 10. The inlets and outlets generally include grates, vents or the like to prevent debris from entering the passages. Furthermore, the inlets and outlets can be flush mounted to protrude from or be recessed in the walls 37 to which they are mounted.

To prevent pressure imbalances within the building 10 during ventilation (e.g. when fresh air is being drawn into the building 10 and stale air expelled from the building 10), the stale air and fresh air passages 18, 20 include flow measuring devices 40 and balancing dampers 42. The measuring devices 40 determine the amount of stale air that is being removed from the building 10 and the amount of fresh air that is being added to the building 10. The balancing dampers 42 are selectively positioned and/or oriented to regulate air flow through the passages 18, 20 such that equal amounts of air are being removed from the building 10 as are being added to the building 10. Particularly, the dampers 42 regulate the air flow by restricting the air flowing through the passages 18, 20. By balancing the rate of air added and removed, the pressure within the building 10 remains substantially constant, which reduces drafts and improves ventilation efficiency.

In a preferred embodiment, the ventilation system 10 has the stale air passage 18 and fresh air passage 20 pass through and connect to an HRV/ERV unit 16. The HRV/ERV unit 16 of the present invention includes a ducted cabinet 46. The ducted cabinet 46 includes duct inlets 48, 50 and duct outlets 52, 54 for the stale air and fresh air passages 18, 20, respectively.

An HRV/ERV unit 16 includes a heat exchanger 60 to fully utilize the temperature state of the stale air that may have been previously conditioned to be warmer or cooler than the fresh ambient air that is being added to the building 10. As the stale air flows from the interior 22 of the building 10, it is used to condition the new fresh air by either heating or cooling the fresh air before it flows into the building's conditioned interior 22. The typical heat exchanger 60 is a double duct heat exchanger 60 wherein the stale air passage 18 is positioned adjacent to the fresh air passage 20 such that heat energy can be conductively and/or convectively transferred from one flow passage 18, 20 to the other passage 20, 18, respectively. Particularly, the energy transfers through the walls of the passages 18, 20.

If the fresh air temperature is warmer than the desired temperature of the stale air inside the building 10, the fresh air relative to the stale air contains more heat energy than is desired. Thus, the heat exchanger 60 transfers a portion of this undesirable heat energy from the warmer fresh air to the cooler stale air. This cools the fresh air being added to the interior 22 of the building 10 to a temperature closer to the desired interior temperature of the building 10, thereby reducing the amount of energy required to further cool the fresh air to the desired interior temperature via standard air conditioning methods. In this situation, the stale air acts to absorb heat energy and cool the fresh ambient air before it is supplied to building 10.

Alternatively, if the fresh air temperature is cooler than the temperature of the stale air inside 22 the building 10, the stale air contains more heat energy than the fresh air that is expelled from the building 10. Thus, as the stale air is purged from the building, valuable heat energy would be likewise being expelled and wasted. To reduce this, the heat exchanger 60 transfers a portion of the heat energy from the warmer stale air to the cooler fresh air. By adding some of the heat energy from the stale air, the fresh air being added to building 10 is warmed to a higher temperature thereby reducing the amount of energy required to raise the fresh air to the desired temperature via standard heating methods such as by a furnace.

To aid in the heat transfer between the fresh air passage 20 and stale air passage 18, in one embodiment the air in the passages 18, 20 flow in opposite directions relative to one another through the heat exchanger 60. It will be appreciated that air flowing through the fresh air passage 20 and the stale air passage 18 remain separate and do not mix.

A heat recovery ventilator is a form of an energy recovery ventilator that will generally only transfer heat energy between the two passages 18, 20. However, other energy recovery ventilators also have the capability of transferring humidity between the two passages 18, 20. Typically, the energy recovery ventilator will use a desiccant wheel 61 to transfer the humidity from the higher humidity passage to the lower humidity passage. The transfer of humidity from one passage to the other can be regulated by varying the rate at which the desiccant wheel 61 turns is known in the art.

As is known in the art, several patents and published applications have recognized that desiccant material and particularly desiccant wheels may be used to transfer humidity between one source of air to another source of air. Such patents that describe humidity transferring technologies include U.S. Pat. Nos. 5,579,647, 5,931,016, 6,355,091, 6,481,222, 6,557,365, 6,575,228, 6,711,907, 6,751,964 and 6,854,279. The teachings and disclosure of each of these patents and published applications are incorporated in their entireties by this reference thereto. Therefore, the desiccant wheel 61 is only shown schematically in FIGS. 1 and 2.

The HRV/ERV unit 16 includes a condensation drain 64 for removing condensation that may develop as a result of the selective heating and cooling of the stale and fresh air via the heat exchanger 60. Furthermore, the fresh air passage 20 may include a defrosting device 65 to warm cool fresh air before it enters the HRV/ERV unit 16 so that condensed moisture does not freeze within the heat exchanger 60.

In the present invention, the HRV/ERV unit 16 includes the means for moving the air through the stale air passage 18 as well as the fresh air passage 20. Unlike the prior HRV/ERV units that use a traditional fan or blower to move air through the ventilation system, the HRV/ERV unit 16 of the present invention utilizes solid state corona discharge apparatuses 70, 72 to drive the air through the system 12. This eliminates any moving parts, provides quieter operation, saves energy, saves space and improves the incoming air quality.

In the illustrated embodiment, the ventilation system 12 includes fresh air and stale air corona discharge apparatuses 70, 72 to move the air. In one embodiment, the fresh air and stale air corona discharge apparatuses 70, 72 are located within the ducted cabinet 46 of the HRV/ERV unit 16. The corona discharge apparatuses 70, 72 may be located either upstream or downstream from the heat exchanger 60 and are positioned in line with the fresh air passage 20 and the stale air passage 18, respectively.

The typical corolla discharge apparatuses 70, 72 employ numerous corona discharge electrodes 76 arranged in arrays and spaced apart from numerous negatively charged attracting electrodes 78 that are also arranged in arrays. When assembled into an array, the corona discharge electrodes 76 can be referred to as an emitter array. Likewise, the attracting electrodes 78 can be referred to as a collector array. Due to the many array configurations and electrode shapes that can be used, the arrays of the corona discharge electrodes 76 and the attracting electrodes 78 have been shown in FIG. 1 in a simplified form.

Each of the corona discharge electrodes 76 and attracting electrodes 78 is coupled to and charged by a high-voltage power supply (not shown). The electrodes 76, and 78 are also preferably controlled and/or managed by related control electronics 82. In addition, the corona discharge electrodes 76 are typically asymmetrical with respect to the attracting electrodes 78. In one embodiment, the corona discharge electrodes 76 are highly curved and resemble the tip of a needle or a narrow wire while the attracting electrodes 78 take the form of a flat plate or a ground plane. The curvature of the corona discharge electrodes 76 ensures a high potential gradient around that electrode.

For the most part, the high potential gradient generated at or near the corona discharge electrodes 76 pulls apart the neutral air molecules in the immediate area. What remains after each neutral air molecule has been dismantled is a positively charged ion and a negatively charged electron. Due to the strong electric field near the corona discharge electrode 76, the ion and electron are increasingly separated from each other, prevented from recombining, and accelerated in opposite directions. Therefore, the ion and electron are both imparted with kinetic energy. Moreover, because a portion of the air molecules in the passages 18, 20 near the corona discharge apparatuses 72, 70 is ionized, the ionized air in passages 18, 20 becomes a conducting medium, the circuit including the corona discharge electrodes 76 and the attracting electrodes 78 is completed, and a current flow can be sustained.

The negatively charged electrons are persuaded to move toward the positively charged corona discharge electrodes 76 due to the difference in charge between them. When the rapidly moving and accelerating electrons collide with other neutral air molecules in the area, further positive ion/electron pairs are created. As more and more positive/ion electric pairs are produced, an electron avalanche is established. The electron avalanche sustains and/or perpetuates the corona discharge process.

In contrast to the negatively charged electrons, the positively charged ions are persuaded to move from near the corona discharge electrodes 76 toward the attracting electrodes 78. This movement is due to the difference in charge between the positively charged ions and the negatively charged attracting electrodes. Like the electrons, when the positively charged ions move they also collide with neutral air molecules. When they collide, the positively charged ions can transfer some of their momentum as well as excess charge to the neutral air molecules. Therefore, the neutral air molecules are knocked toward the attracting electrode 78 or are ionized and then drawn to the attracting electrode. In either case, the positively charged ions and other air molecules end up flowing from the corona discharge electrodes 76 toward the attracting electrodes 78.

The movement or flow of the air particles away from the corona discharge electrodes 76 and toward the attracting electrodes 78 causes or results in what is referred to by those skilled in the art as an electric wind or electrostatic fluid acceleration. In the illustrated embodiment of FIG. 1, the electric wind generated by the stale air corona discharge apparatus 72 travels through the stale air passage 18 in a direction depicted by arrows 86. Likewise, the electric wind generated by the fresh air corona discharge apparatus 70 travels through the fresh air passage 20 in a direction depicted by arrows 88.

The velocity and volume of the air moving through passages 18, 20 is proportional to the voltage difference between the electrodes 76, 78 and the size of the arrays of the corona discharge apparatuses 72, 70 in the respective passages 18, 20. By varying the potential between the electrodes 76, 78, the size and dimensions of the passages, and the like, the velocity and volume of the electric wind can be increased and decreased over a continuous range as desired. The range may be manually adjusted with a simple adjustment knob or remote control. With the appropriate configuration, air flows exceeding six hundred cubic feet per minute are possible.

When the positively charged ions creating the electric wind reach the attracting electrodes 78, the positive charge is removed by permitting a recombination of the negatively charged electrons with the positively charged ions. Due to the recombination, a neutral air molecule once again exists in passages 18, 20. Advantageously, these neutral air molecules retain their velocity and direction.

In a preferred embodiment, one or more of the corona discharge apparatuses 70, 72 can be used for cleaning and scrubbing the air passing through the stale and fresh air passages 18, 20, respectively. As known to those skilled in the art, contaminants and particles tend to adhere to the attracting electrode 78 during the corona discharge process. Therefore, the air passing through the passages 18, 20 from the building and into the building can be purified. Notably, the attracting electrodes 78, which are often plates, are preferably removable to permit inspection, cleaning, and replacement. In an alternative embodiment, the entire corona discharge apparatuses 70, 72 are removable.

As is known in the art, several patents and published applications have recognized that corona discharge devices may be used to generate ions and accelerate and filter fluids such as air. Such patents and published applications that describe fluid and/or air moving devices and technology include the following U.S. Pat. Nos. 3,638,058, 3,699,387, 3,751,715, 4,210,847, 4,231,766, 4,380,720, 4,643,745, 4,789,801, 5,077,500, 5,667,564, 6,176,977, 6,504,308, 6,664,741, and 6,727,657 and U.S. Pub. Pat. Applns. 2004/0217720, 2004/0212329, 2004/0183454, 2004/0155612, 2004/0004797, 2004/0004440, 2003/0234618, and 2003/0090209. The teachings and disclosure of each of these patents and published applications are incorporated in their entireties by reference thereto.

While other ion discharge or corona fluid movement technologies may be employed in the system and method of the present invention, a preferred embodiment of the present invention utilizes the technology described in one or more of the preceding patents and/or published applications, and most preferably, the technology described in U.S. Pat. Nos. 6,504,308, 6,664,741, and 6,727,657 issued to Kronos Advanced Technologies, Inc., of Belmont, Mass. The teachings and disclosures of each of these patents are also incorporated in their entities by reference thereto.

Furthermore, in a preferred embodiment, the ventilation system 12 further comprises ozone depletion apparatuses 79 for reducing the amount of ozone in the air. In general, the ozone depletion apparatuses 79 are any systems, devices, or methods having the ability to degenerate ozone into oxygen molecules (i.e., dioxide) and/or absorb ozone. In particular, the ozone depletion apparatuses 79 can be filters, catalyst compositions situated proximate the air flow, and the like. When the ventilation system 12 is equipped with the ozone depletion apparatus 79, the ozone generated by the corona discharge apparatus 70, 72 can be maintained below a desired level, relegated to within a predetermined range, and otherwise managed.

The ozone depletion apparatuses 79 are preferably disposed within the passages 18, 20 proximate the corona discharge apparatus 70, 72. As shown, the ozone depletion apparatuses 79 are generally downstream of the corona discharge apparatuses 70, 72. As such, air flowing out of the outlets 28, 30 is purified by the ozone depletion apparatuses 79 prior to being exhausted from the ventilation system 12.

As is known in the art, several patents have recognized that ozone depletion devices and systems may be used to convert ozone to oxygen (i.e., dioxide), absorb ozone, and the like. Such patents that describe converting and absorbing devices, methods, and technology include the following U.S. Pat. Nos. 4,343,776, 4,405,507, 5,422,331, 6,375,902, 6,375,905, and 6,699,529. The teachings and disclosure of each of these patents are incorporated in their entireties by reference thereto.

In operation, the corona discharge apparatuses 70, 72 create electric winds that move fresh air into the building 10 and/or expel stale air from the building 10 via fresh air passage 20 and stale air passage 18, respectively. As the stale air is removed from the building it takes with it pollutants that were previously trapped within the building. In this embodiment, the dampers 42 and measuring devices 40 control the flow of air through the passages 18, 20 such that the pressure within the building remains constant.

Furthermore, as the corona discharge apparatuses 70, 72 drive the air through the passages 18, 20, they drive the air through the heat exchanger 60 such that heat energy is transferred between the stale air flow and the fresh air flow. This transfer of energy increases the overall efficiency of the building 10.

It will be appreciated that in one embodiment, only a single corona discharge apparatus is used to ventilate the building. In this embodiment, the corona discharge apparatus either draws air into the building or expels air from the building. If air is added to the building, the pressure inside the building increases creating a pressure differential between the interior and exterior of the building that forces air to be expelled through the stale air passage. If air is removed from the building, the pressure inside the building decreases creating a pressure differential between the interior and exterior of the building that draws air into the building. Furthermore, one of the two passages that connects the interior of the building with the exterior of the building could merely be passages within the building materials themselves.

Figure 2:
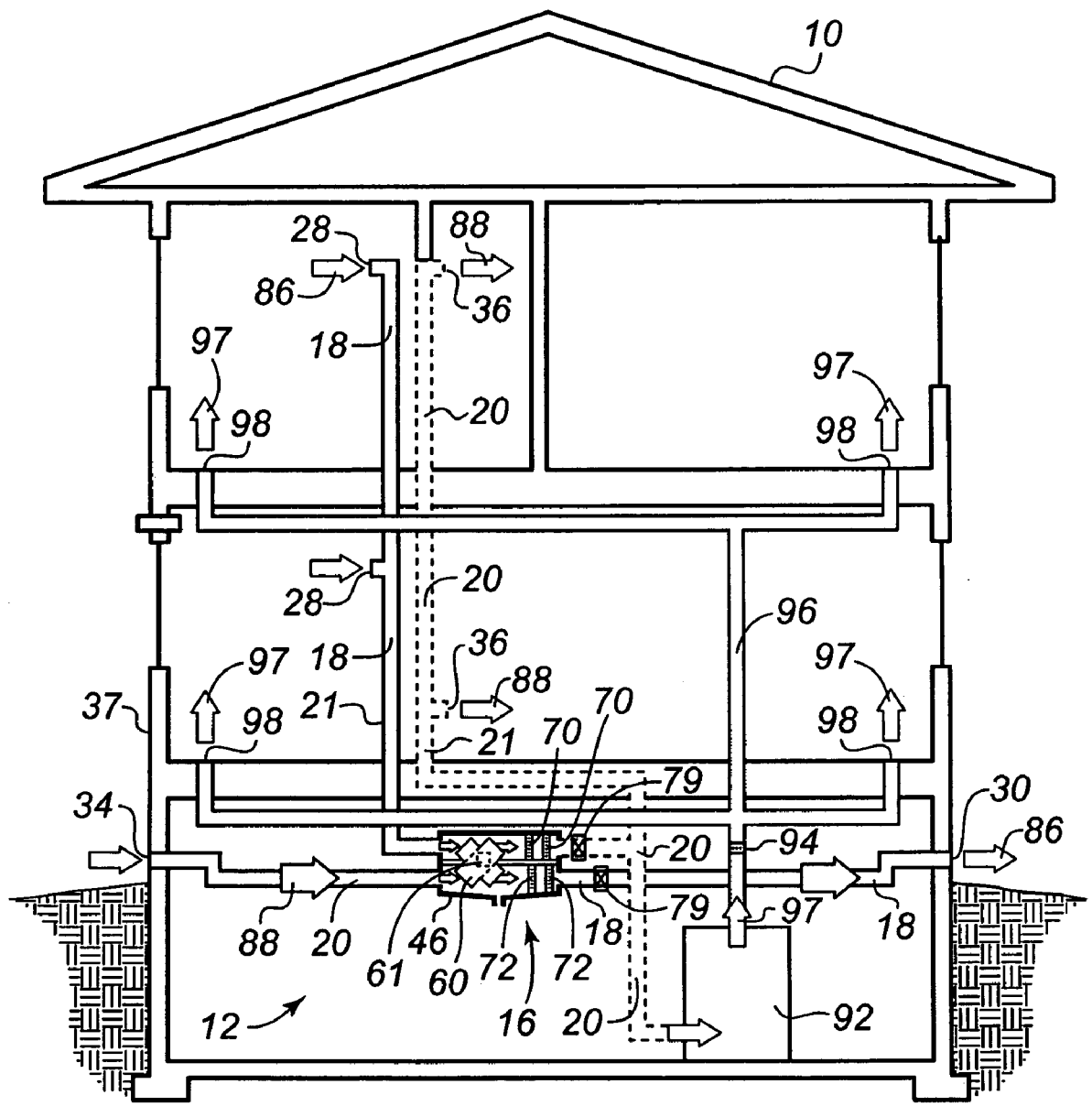
FIG. 2 is a further embodiment of a ventilation system having an HRV/ERV unit constructed in accordance with the teachings of the present invention.

In an alternative embodiment, illustrated in FIG. 2, the fresh air passage 20 may be further connected to a furnace or air conditioning unit 92 to further heat or cool the fresh air prior to expelling the fresh air into the building 10. This embodiment may include a further corona discharge apparatus 94 to move the air through the furnace or air conditioner 92 as well as through a conditioned air passage 96 to distribute the newly conditioned air throughout the building 10. The corona discharge apparatus 94 moves the air in a direction depicted by arrows 97. This passage 96 includes outlets 98 throughout the building 10 to expel the air.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A ventilation system for a building having an interior and an exterior, the ventilation system comprising:
 a first passage extending between a first inlet and a first outlet, the first passage providing fluid communication between the interior and the exterior;
 a second passage extending between a second inlet and a second outlet, the second passage providing fluid communication between the interior and the exterior; and
 at least one corona discharge apparatus positioned relative to at least one of the first passage and the second passage to cause fluid to flow from the exterior to the interior through the first passage and fluid to flow from the interior to the exterior through the second passage.

2. The ventilation system of claim 1, wherein the first passage includes a first at least one corona discharge apparatus positioned to drive fluid from the exterior to the interior, and wherein the second passage includes a second at least one corona discharge apparatus positioned to drive fluid from the interior to the exterior.

3. The ventilation system of claim 2, further comprising an energy recovery ventilator including a heat exchanger coupled to the first and second passages adapted to transfer heat energy between the fluid driven through the first and second passages by the first and second at least one corona discharge apparatuses, respectively.

4. The ventilation system of claim 3, wherein the energy recovery ventilator includes a means for transferring humidity between the first passage and second passage.

5. The ventilation system of claim 1, further comprising a controller operatively coupled to the at least one corona discharge apparatus to control energization thereof to selectively control the amount of fluid being driven through the first and second passages.

6. The ventilation system of claim 1, wherein the at least one corona discharge apparatus filters the fluid driven thereby.

7. The ventilation system of claim 6, wherein the at least one corona discharge apparatus is adapted to be removed from the ventilation system for cleaning.

8. The ventilation system of claim 1, further comprising balancing dampers positioned within the first and second passages to selectively regulate the flow of fluid therethrough.

9. The ventilation system of claim 1, further including at least one of a furnace or air conditioner, and wherein the first passage is connected to the at least one furnace or air conditioner.

10. The ventilation system of claim 1, further comprising at least one ozone depletion apparatus for reducing the amount of ozone in the fluid flowing through the first and second passages.

11. An energy recovery ventilator for use in a building ventilation system, the energy recovery ventilator comprising:
a heat exchanger;
a first corona discharge apparatus positioned to move fluid from a first source through the heat exchanger;
a second corona discharge apparatus positioned to move fluid from a second source through the heat exchanger; and
the heat exchanger adapted to transfer heat energy between fluid from the first source and fluid from the second source.

12. The energy recovery ventilator of claim 11, wherein the first corona discharge apparatus comprises a first positively charged emitter array and a first negatively charged collector array in spaced relation to the first positively charged emitter array, the first positively charged emitter array and the first negatively charged collector array cooperatively producing a first electric wind when energized to move fluid from the first source through the heat exchanger, and wherein the second corona discharge apparatus comprises a second positively charged emitter array and a second negatively charged collector array in spaced relation to the second positively charged emitter array, the second positively charged emitter array and the second negatively charged collector array cooperatively producing a second electric wind when energized to move fluid from the second source through the heat exchanger.

13. The energy recovery ventilator of claim 12, further including at least one controller for selectively varying a potential difference between the positively charged emitter arrays and the corresponding negatively charged collector arrays of the first and second corona discharge apparatuses to vary the flow of fluid drawn thereby.

14. The energy recovery ventilator of claim 12 wherein the negatively charged collector arrays of the first and second first corona discharge apparatuses are adapted to filter the fluid from the first and second sources, respectively.

15. The energy recovery ventilator of claim 14, wherein at least the first and second negatively charged collector arrays are removably positioned in the energy recovery ventilator to allow removal for cleaning and replacement thereof.

16. The energy recovery ventilator of claim 11, further including a ducted cabinet, the ducted cabinet including a first passage extending between a first inlet and a first outlet and passing through the heat exchanger, the first passage having the first corona discharge apparatus positioned therein, and a second passage extending between a second inlet and a second outlet and passing through the heat exchanger, the second passage having the second corona discharge apparatus positioned therein.

17. The energy recovery ventilator of claim 16, wherein the ducted cabinet includes a condensation drain.

18. The energy recovery ventilator of claim 11, wherein the heat exchanger includes a desiccant wheel adapted to transfer humidity between the first and second passages.

19. A method of ventilating a building having an interior and an exterior comprising the steps of:
drawing fresh fluid using at least one corona discharge apparatus into the building through first passage extending between a first inlet and a first outlet and providing fluid communication between the exterior and the interior; and
expelling stale fluid using the at least one corona discharge apparatus from the building through a second passage extending between a second inlet and a second outlet and providing fluid communication between the interior and the exterior.

20. The method of claim 19, further comprising the step of transferring heat energy between the fresh fluid and the stale fluid.

21. The method of claim 19, further comprising the step of filtering at least one of the fresh fluid and the stale fluid using the at least one corona discharge apparatus.

22. The method of claim 19, further comprising the step of transferring humidity between the fresh fluid and the stale fluid.

23. The method of claim 19, further comprising the step of removing ozone from at least one of the fresh fluid drawn into the building and stale air expelled from the building.

* * * * *